UNITED STATES PATENT OFFICE.

FERDINAND GERHARD WIECHMANN, OF NEW YORK, N. Y.

METHOD OF TREATING VEGETABLE ALBUMIN FOR THE PRODUCTION OF AN ARTICLE OF MANUFACTURE USEFUL IN THE ARTS AND A PRODUCT.

No. 883,995.      Specification of Letters Patent.      Patented April 7, 1908.

Application filed October 30, 1906. Serial No. 341,242.

*To all whom it may concern:*

Be it known that I, FERDINAND GERHARD WIECHMANN, a citizen of the United States, residing at New York city, county and State of New York, have invented a method of treating vegetable albumin for the production of an article of manufacture useful in the arts and a product, of which the following is a specification.

Broadly stated, my invention consists; first: in a method of treating vegetable albumin, i. e., protein, however derived, to convert it into a plastic, semi-solid or solid mass, having characteristics which permit such mass to be molded, cast, pressed, or vulcanized into shapes, and thus allow its use under conditions where rubber or other similar resilient materials have heretofore been used. Second: the production of an article of manufacture having the characteristics of rubber as to resiliency, capacity for molding and coloring, which is a non-conductor of electricity, non-inflammable, and which, when appropriately treated, like rubber, may be given different degrees of hardness.

To carry my invention into effect, I proceed as follows:—I take a definite quantity of vegetable albumin—protein—which in amount will depend upon the primary product to be produced, i. e., whether it is to be plastic, semi-solid or solid. If a plastic product is required, the percentage of the vegetable albumin employed will be approximately forty per cent. of the weight of the mass; if a semi-solid, approximately sixty per cent., and if a solid, eighty per cent.

I wish it understood that I do not limit myself in any wise to the specific percentages stated, as they will vary in accordance with the origin of the vegetable albumin employed.

The vegetable albumin employed is derived from plants and is included under the generic terms "protein" or "proteid" and includes such bodies as are commonly designated—vegetable albumins, vegetable caseins, and vegetable glutens.

A convenient way of obtaining vegetable albumin is from the waste of the vegetable ivory nut, (corozo), such as accrues in the manufacture of buttons. It may also be obtained from many vegetable substances, such as wheat, peas, lentils, horse beans and vetch.

The vegetable albumin may be in any condition, fluid, semi-fluid, plastic or solid. I prefer, however, that it shall be in a finely divided condition, as when in such condition it is more readily mixed with the other substances employed, to which I will now refer.

To the required percentage of vegetable albumin, which, as before stated, will depend upon the character of the primary product to be produced, I add as a solvent, i. e., a body with which it may chemically combine to form a new product, animal casein, dissolved in an organic acid, such as acetic acid, or in a solution of an alkali, such as potassium hydroxid, or other suitable solvents may be employed.

The two bodies, i. e., the vegetable albumin and the animal casein above described, are preferably subjected to constant stirring, or other forms of agitation, with or without the application of heat. The product obtained, i. e., the primary mass, if plastic or semi-solid, can be molded or pressed into shapes in any way common in the arts. If a final hard product is required, i. e., harder than the final product obtained by varying the percentages of the vegetable albumin employed, I may stir into the mixture of vegetable albumin and animal casein any loading substance, such as lime, celluloid, sulfur, rubber, indurated fiber, siccative oils, diatomaceous earth, silica clays, or the like, and to give color to the product I may use bleaching agents, such as chlorin, chlorid of lime, hydrogen peroxid, or I may add pigments in a fluid or solid state, or through heat or electricity effect re-action between, or by acting upon, the introduced materials, as is well known in the art of production of color. I may also subject the materials during mixing at any time to the action of high or low temperature.

The molds employed may be either hot or cold, depending upon the product which I desire to obtain and the pressure which is employed.

I wish it understood that I do not limit myself in any wise to the materials which may be incorporated with the original percentages of vegetable albumin and animal casein for loading purposes, for hardening purposes, for coloring purposes, or otherwise, or to the subsequent treatment to which the product may be subjected, as, for instance, vulcanization, etc., as all such steps are within the contemplation of my invention.

The product produced, whatever its degree of hardness, I consider to be a new chemical product, due to the combination of vegetable albumin with animal casein.

The physical characteristics of the product produced, where no coloring or loading materials are added, i. e., its hardness, color, resiliency, non-combustibility, and specific gravity are entirely different from those of either vegetable albumin or animal casein, and so far as I am aware, it is impossible by any chemical or mechanical process to separate either of these bodies from the product.

I wish it understood that I consider myself to be the first to conceive the possibility of, and to describe how, vegetable albumin may be converted when treated with a solution of animal casein into a body useful in the arts, thereby bringing about the utilization of products which have heretofore been of little or no value.

Having thus described my invention, I claim:

1. A process of treating vegetable albumin, which consists in subjecting it to the action of animal casein.

2. A process of treating vegetable albumin, which consists in subjecting it to the action of a solution of animal casein.

3. A process of treating vegetable albumin, which consists in reducing it to a divided condition, and then subjecting it to the action of a solution of animal casein.

4. A process of treating vegetable albumin, which consists in subjecting it to the action of a solvent of the character described, then introducing one or more bodies of the character described, then molding.

5. A process of treating vegetable albumin, which consists in subjecting it to the action of a solvent of the character described, then to the action of a body such as sulfur, then molding, and finally vulcanizing.

6. A process of treating vegetable albumin, which consists in subjecting it to the action of a solvent of the character described, then introducing a loading material and a coloring material, then drying.

7. A process of treating vegetable albumin, which consists in subjecting it to the action of a solvent of the character described, then molding, and simultaneously to pressure.

8. A process of treating vegetable albumin, which consists in subjecting it to the action of a solvent of the character described and to the action of heat.

9. A process of treating vegetable albumin, which consists in subjecting it to the action of a solvent of the character described, then introducing a body which will effect its resiliency.

10. A process of producing the product herein described, which consists in effecting a chemical combination between vegetable albumin and a solution of animal casein.

11. As a new article of manufacture, a body composed of vegetable albumin and animal casein.

12. As a new article of manufacture, a body having as its distinguishing characteristics hardness and resiliency like that of rubber but containing no rubber.

13. As a new article of manufacture, a body composed of a chemical combination of vegetable albumin and animal casein and simulating rubber.

In testimony whereof, I affix my signature, in the presence of two witnesses.

FERDINAND GERHARD WIECHMANN.

Witnesses:
FREDERICK A. BLOUNT,
FRANK J. O'CONNOR.